Dec. 19, 1967  H. W. PRATT  3,358,634
AMPHIBIOUS VEHICLE
Filed Jan. 27, 1966  3 Sheets-Sheet 1

INVENTOR
Houston W. Pratt
BY
Brown & Seward
ATTORNEYS

Dec. 19, 1967  H. W. PRATT  3,358,634
AMPHIBIOUS VEHICLE
Filed Jan. 27, 1966  3 Sheets-Sheet 2

INVENTOR
Houston W. Pratt
BY
Brown & Seward
ATTORNEYS

Dec. 19, 1967  H. W. PRATT  3,358,634
AMPHIBIOUS VEHICLE
Filed Jan. 27, 1966  3 Sheets-Sheet 3

INVENTOR
Houston W. Pratt
BY
Brown & Seward
ATTORNEYS

United States Patent Office 3,358,634
Patented Dec. 19, 1967

3,358,634
AMPHIBIOUS VEHICLE
Houston W. Pratt, 90 Duck Pond Road,
Glen Cove, N.Y. 11542
Filed Jan. 27, 1966, Ser. No. 523,435
9 Claims. (Cl. 115—1)

ABSTRACT OF THE DISCLOSURE

A supporting and propelling device for amphibious vehicles comprising an inflatable endless belt carried on drums rotatably mounted on the vehicle and normally power driven, at least one of said drums being so constructed that its diameter can be changed in order to vary the contour of the path of travel of the belt thus adapting the assembly for efficient operation on different surfaces or types of terrain.

---

This invention relates to a device for supporting and propelling an amphibious vehicle and more particularly to an endless belt or track drive arrangement in which the shape of the closed path of travel of the endless belt may be varied depending on the condition of the surface on which the vehicle travels.

Heretofore, endless belts or tracks used for propelling vehicles have generally been mounted on fixed diameter supporting wheels or drums or they have been otherwise mounted for guided movement about a fixed path of travel relative to the vehicle. It was not possible to adapt the vehicle to different terrain or surface conditions by changing the path of travel of the belt. For example, an amphibious vehicle propelled by endless belts, each supported on two drums, might operate quite satisfactorily on relatively smooth water or on moderately rough terrain. However, the operation tends to become impaired as the surface conditions get rougher. In many cases, the situation can be improved by changing the path or contour about which the belt or track travels. This may be done, according to the present invention, by changing the diameter of the support drums about which the belt travels to present a larger frontal belt area to the terrain or water. Thus when traveling on water, a wave breaking over the front of the endless belt tending to swamp the vehicle might otherwise be prevented from doing so when the frontal area of the belt is increased by an enlargement in diameter of the front drum. When traveling on land, a larger frontal area would be more effective on soft terrain and in passing over large protruding objects and depressions.

According to the present invention, it is also possible to provide increased buoyancy for the vehicle as the diameter of the support drum is increased by making the latter inflatable. In addition, a variable diameter drum can be employed to raise and lower the vehicle relative to the surface on which it travels.

Accordingly, it is an object of the present invention to provide an endless belt or track for an amphibious vehicle wherein the closed path of travel of the belt or track may be varied as desired depending on the condition of the surface on which the vehicle travels.

A further object is to provide, in one embodiment, a variable closed path of travel for an endless traction belt wherein the buoyancy afforded is varied and whereby the height of the vehicle, which is driven by the endless traction belt, is also varied relative to the surface on which it travels.

A further object is to provide certain improvements in the form, construction, arrangement, and material of the several elements whereby the above and other objects may effectively be attained.

Other objects and features of the invention will appear as the description of the particular physical embodiment selected to illustrate the invention progresses.

A practical embodiment of the invention is shown in the accompanying drawings, wherein.

Figure 1:
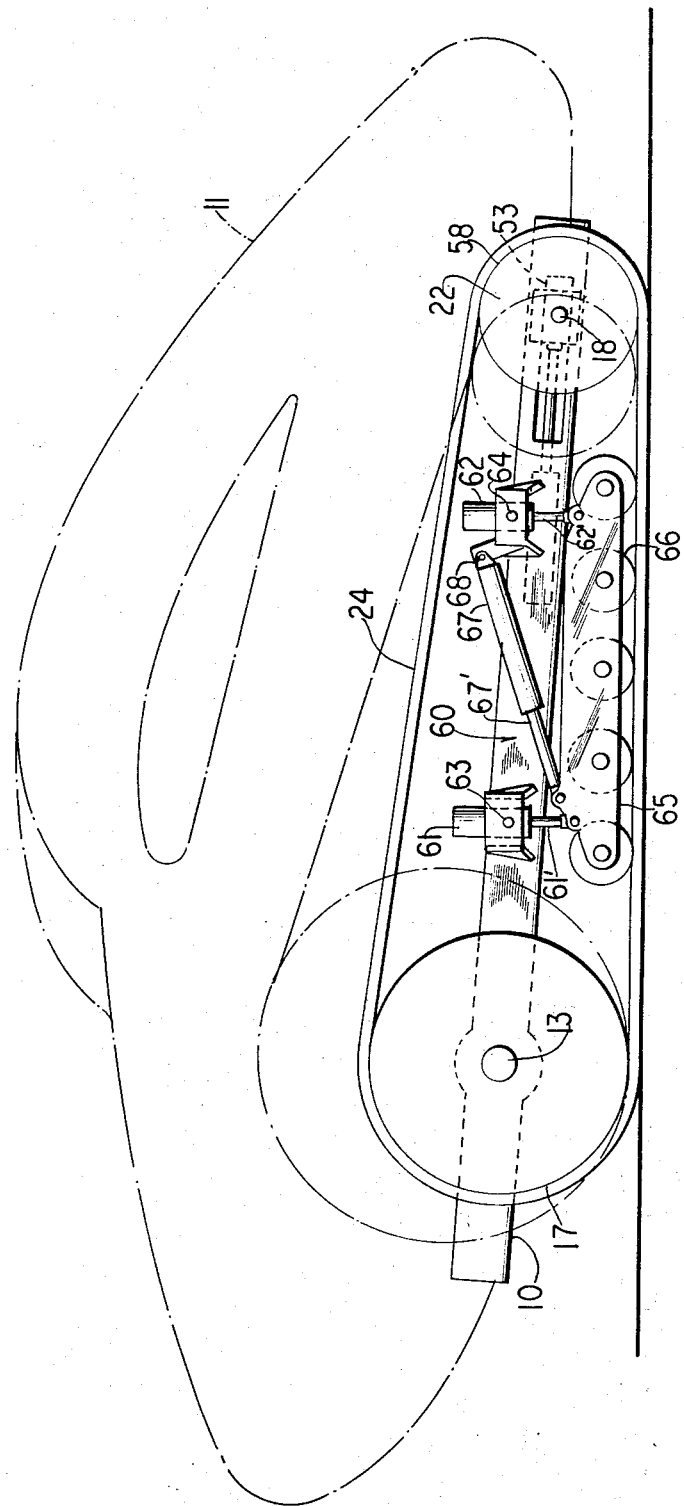
FIG. 1 is an elevational view of an endless belt arrangement for propelling a vehicle, the body of the latter being represented by broken lines.
Figure 2:
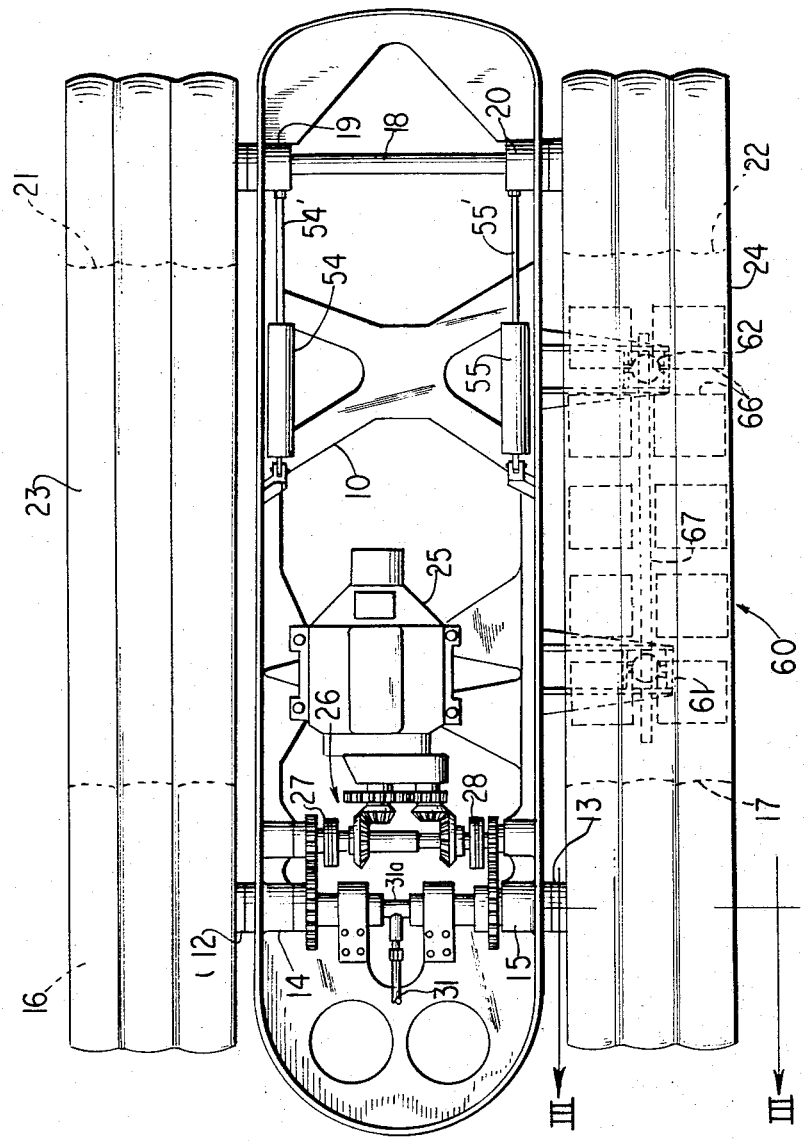
FIG. 2 is a plan view of FIG. 1 with the body removed.

Referring to the drawings, a frame 10 carries a body 11, the outline of the latter being indicated by broken lines. A pair of front axles 12 and 13 journaled to the frame 10 at 14 and 15, respectively, mount front drums 16 and 17 while a rear axle 18 journaled in bearings 19 and 20, which are slidably mounted on the frame 10 as will be described, mount rear drums 21 and 22. Running over the front and rear drums on each side are the endless belts 23 and 24. The belts 23, 24 are driven, respectively, by the front drums 16, 17, the latter in turn being driven by the motor 25 through gearing indicated generally at 26. Suitable control devices, such as the clutches 27, 28, may be employed to disengage either one or both of the front drums from the engine, it being understood, however, that the power drive for the front drums is not a novel feature of the invention and that any suitable system may be employed for driving, disengaging, or reversing one or both of the front drums.

Figure 4:
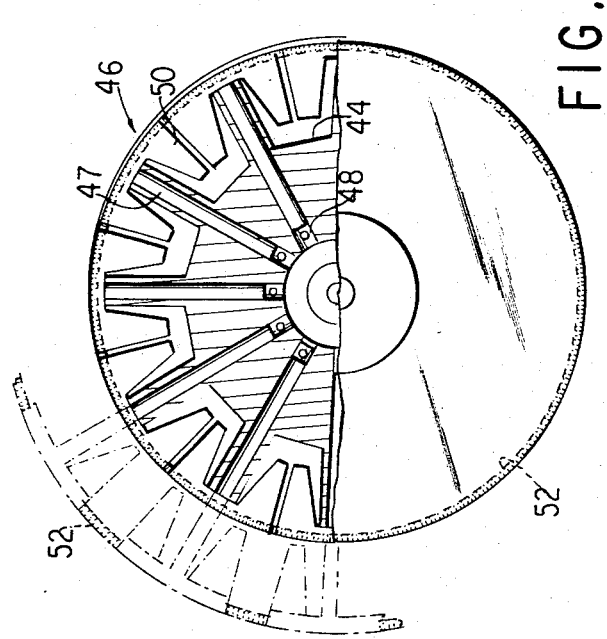
FIG. 4 is a sectional view looking along the cutting plane IV—IV of FIG. 3.
Figure 3:
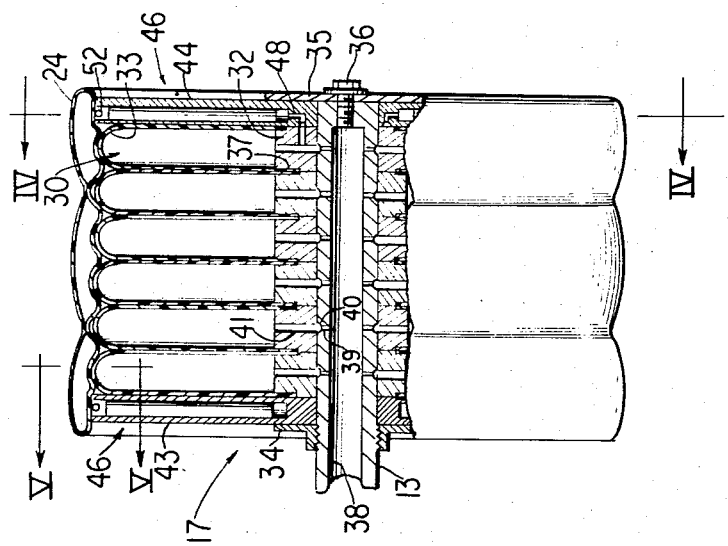
FIG. 3 is a sectional view of the front drum taken along the cutting plane III—III of FIG. 2.

In order to change the fixed path of travel of each endless belt, means are provided to vary the diameter of the front drums 16, 17. As best shown in FIGS. 3 and 4, this is accomplished by arranging a plurality of inflatable members, indicated generally at 30 (FIG. 3), in juxtaposed position on the front axle 13. Each member 30 comprises a collar 32 mounted on the front axle and carrying an inflatable tube 33. The collars 32 are held in abutting relationship by the flange 34, fixed to the front axle 13 by threads, and a second flange 35 and member 36 threaded to the axle 13 for urging the collars 32 toward the flange 34. The inner edges of the tubes 33 are mounted on annular grooves 37 on the sides of the collars 32 as shown in FIG. 3 whereby the edges of two adjacent tubes 33 are wedged within a double width groove between the two adjacent collars 32 as the latter are forced together by the threaded member 36. Suitable sealing compound may be used between the collars 32 and tubes 33 to insure an air tight seal. Alternatively, the tubes may be mounted on the collars by an annular mounting ring (not shown) secured to the sides of the collar by threaded fasteners to wedge the inner edge of the tube between the mounting ring and the collar.

In order to inflate the tubes 33, means are provided to conduct air under pressure from a suitable source (not shown) to each tube 33. Compressed air is conducted from the source via the conduit 31 to a fitting 31a which makes a sliding and sealing connection with the front axles 12, 13 to deliver compressed air to axial passages 38 in each front axle. Radial passages 39 lead from the axial passage 38 to circumferential grooves 40 on the axle 13. Each collar 32 has one or more radial passages 41 aligned with the circumferential grooves 40 so that air can be supplied to each tube 33 at any rotative position of the mounting collars 32.

To prevent expansion of the tubes 33 in an axial direction, housings 43, 44 at each axial end of the front drum 17 receive slide members, indicated generally at 46, which are pneumatically actuated to extend and retract in a radial direction. The slide members 46 each comprise a rod 47 operating in a cylinder in the housings 43, 44, the latter cylinders being supplied with air under pressure via the passages 48. The outer diametral ends of the rods 47 have plates 50 mounted thereon to provide a greater contact area for the sides of the tubes 33. The slide members 46 operate in unison with the inflatable tubes 33 so that as the latter expand radially, the slide members 46 are extended radially to prevent axial expansion. Each slide member 46 has aligned passage to receive an endless resilient member 52 (e.g. a coil spring) tending to prevent the slide members from sliding in and out when they pass from the rear of the drum, where they do not contact the endless belt 24 and there is no inwardly directed radial force acting thereon, to the front where the endless belt 24 urges them radially inward.

It will be apparent from the above description that the front drum 17 may be inflated and its diameter increased from the solid line to the broken line positions shown in FIG. 1. The endless belt 24 may be sufficiently elastic and stretchable in order to adapt itself to the increased diameter. Also the rear drum 22 may be moved forward to provide slack in the endless belt 24 which will be taken up by the larger diameter front drum. Accordingly, the bearings 19, 20 for the rear axle 18 are slidably mounted in the guide ways 53 (only one shown) on the frame 10. Power cylinders 54, 55 having piston rods 54', 55' connected to the bearings 19, 20 respectively, are operable to slide the latter in either direction as the diameter of the front drums are varied.

Each rear drum 21, 22 comprise a plurality of pneumatic tires 58 juxtaposed on the rear axle 18 and designed to inflate to a fixed diameter similar to an automobile tire. The rear drums 21, 22 in the illustrated embodiment are not, therefore, of the variable diameter type as are the front drums, but as an alternative embodiment, they may be made like the front drums.

Inflation of the front drums 16, 17 will raise the frame 10. When this happens the idler carriage, indicated generally at 60, for supporting the lower run of the endless belt 24 will also rise because the idler carriage 60 is mounted on the frame 10. In order to provide for the proper idler support for the lower run of the endless belt 24 at all times, irrespective of the height of the frame 10 above the ground, the idler carriage 60 is mounted for up and down movement relative to the frame 10. This is accomplished by power cylinders 61, 62 pivotally mounted to the frame 10 at 63 and 64 respectively and having piston rods 61', 62' pivotally connected to the idler carriage frame 65. It will be evident that the idler carriage 60 which comprises the idler frame 65 rotatably mounting idler wheels 66, may be raised and lowered to adapt itself to the proper elevation to provide the required back-up support for the lower run of the endless belt 24. A power cylinder 67 carried on the frame 10 at 68, has a piston rod 67' pivotally connected to the idler carriage frame 65. The power cylinder 67 serves to keep the carriage frame 65 in the proper position even though the carriage frame 65 is pivotally mounted to the main frame via the power cylinders 61, 62 and pivotal mountings 63, 64.

Figure 5:
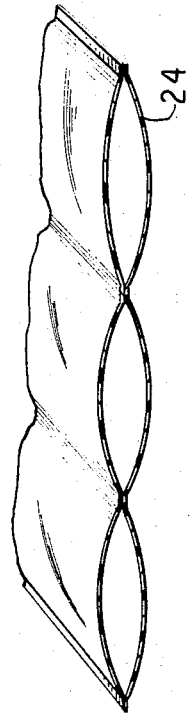
FIG. 5 is a fragmentary perspective and sectional view of an alternate embodiment looking along the line V—V of FIG. 3.

The endless belts may be made of a suitable stretchable and elastic material, for example, natural and/or synthetic rubber or the newer rubber-like plastic materials (e.g. Firestone's Duradene or Shell's Thermolastic 125) having elastic properties. The endless belt 24 may be compartmentalized transversely as shown in FIG. 3 and also, as an alternative embodiment, it may be compartmentalized longitudinally as shown in FIG. 5, each compartment being inflated with air under pressure.

Although in the above description, only one of the two endless belt drive arrangements has been described in detail, it will be understood that both of them are similarly constructed. The inflatable front and rear drums 16, 17 and 21, 22 respectively, along with the compartmentalized and inflatable endless belts 23, 24 may be made of sufficient size to provide the required buoyancy to support the vehicle on water as desired. Buoyancy tanks may be mounted between the upper and lower runs of the endless belt, on the frame 10, or in the vehicle body.

The endless belt drive arrangement described above may be used on an amphibious surface vehicle or as landing gear for an amphibious aircraft. In the latter case, inflation of the front drum when the aircraft is in flight will serve as an air brake.

It will be understood that various changes may be made in the form, construction and arrangement of the several parts without departing from the spirit and scope of the invention and hence I do not intend to be limited to the details shown or described herein except as the same are included in the claims or may be required by disclosures of the prior art.

What I claim is:

1. A propelling device for an amphibious vehicle comprising drums rotatably mounted on said vehicle, an endless belt travelling over said drums about a closed path of travel, the drums being enclosed within said path, and means for changing the diameter of one of said drums to vary the contour of the closed path of travel thereby adapting the vehicle to different terrain and surface conditions.

2. A propelling device according to claim 1 wherein said variable diameter drum is inflatable in a radial direction relative to its axis of rotation.

3. A propelling device according to claim 1 wherein said variable diameter drum comprises a supporting shaft, and a plurality of inflatable members arranged in juxtaposed position axially on the supporting shaft.

4. A propelling device according to claim 3 wherein said supporting shaft has an axial passage and a plurality of radial passages leading from the axial passage to the inflatable members for supplying inflation fluid to the latter members.

5. A propelling device according to claim 1 wherein said variable diameter drum comprises inflatable members mounted on a supporting shaft, and restraining means on either axial side of said inflatable members preventing axial expansion of said members when the latter are inflated.

6. A propelling device according to claim 5 wherein said restraining means comprises a housing mounted on said shaft, and a radially extendable support slidable in said housing under the action of fluid pressure.

7. A propelling device according to claim 1 further comprising an idler wheel carriage for the lower ground-contacting run of the endless belt, and means for raising and lowering the idler wheel carriage on the vehicle to compensate for varying heights of the vehicle above the ground brought about by the change in diameter of said one drum.

8. A propelling device according to claim 1 wherein said endless belt is made of an elastic material adapted to stretch and contract as the diameter of said variable diameter drum is increased and decreased respectively.

9. A propelling device according to claim 8 wherein said belt comprises a plurality of air-tight compartments adapted to be inflated to constitute flotation members for water-borne travel.

References Cited

UNITED STATES PATENTS

| | | | |
|---|---|---|---|
| Re. 24,272 | 2/1957 | Albee | 305—34 X |
| 1,989,573 | 1/1935 | Von Loutzkoy. | |
| 2,374,240 | 4/1945 | Shankman | 115—1 X |
| 2,652,289 | 9/1953 | Bekker | 305—35 X |
| 3,170,533 | 2/1965 | Fewel | 305—34 X |
| 3,182,741 | 5/1965 | Roach | 305—10 X |

FOREIGN PATENTS 1,044,699  6/1953  France.

RICHARD J. JOHNSON, *Primary Examiner.*